United States Patent
Lema et al.

(10) Patent No.: US 11,454,964 B2
(45) Date of Patent: *Sep. 27, 2022

(54) SYSTEMS AND METHODS FOR ADJUSTING FLIGHT CONTROL OF AN UNMANNED AERIAL VEHICLE

(71) Applicant: GoPro, Inc., San Mateo, CA (US)

(72) Inventors: Pablo Lema, Burlingame, CA (US); Shu Ching Ip, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/827,241

(22) Filed: Mar. 23, 2020

(65) Prior Publication Data
US 2020/0218252 A1    Jul. 9, 2020

Related U.S. Application Data

(63) Continuation of application No. 15/807,399, filed on Nov. 8, 2017, now Pat. No. 10,599,139, which is a
(Continued)

(51) Int. Cl.
*G05D 1/00* (2006.01)
*B64C 39/02* (2006.01)
(Continued)

(52) U.S. Cl.
CPC .......... *G05D 1/0016* (2013.01); *B64C 39/024* (2013.01); *G05D 1/0033* (2013.01);
(Continued)

(58) Field of Classification Search
CPC ....... G06K 2009/00738; G06D 1/0094; G05D 1/12; G06V 20/44
See application file for complete search history.

(56) References Cited

U.S. PATENT DOCUMENTS

| | | |
|---|---|---|
| 6,320,173 B1 | 11/2001 | Vock |
| 9,158,304 B2 | 10/2015 | Fleck |
| (Continued) | | |

FOREIGN PATENT DOCUMENTS

| | | | | |
|---|---|---|---|---|
| WO | 2016065623 A1 | 5/2016 | | |
| WO | WO-2016065623 A1 * | 5/2016 | ........... | B64C 39/024 |

OTHER PUBLICATIONS

AirDog, AirDog Products, Mar. 24, 2015, https://web.archive.org/web/20150324185141/https://www.airdog.conn/products (Year: 2015) 8 pages.

*Primary Examiner* — Russell Frejd
*Assistant Examiner* — Sara J Lewandroski
(74) *Attorney, Agent, or Firm* — Young Basile Hanlon & MacFarlane, P.C.

(57) ABSTRACT

A first pattern associated with a performer may be recognized based upon visual information. A sensor carried by an unmanned aerial vehicle may be configured to generate output signals conveying the visual information. A first distance may be determined between the first pattern and the unmanned aerial vehicle. A second pattern associated with a performee may be recognized based upon the visual information. A second distance may be determined between the second pattern and the unmanned aerial vehicle. Flight control may be adjusted based upon the first distance and the second distance. A flight control subsystem may be configured to provide the flight control for the unmanned aerial vehicle.

20 Claims, 4 Drawing Sheets

Related U.S. Application Data continuation of application No. 15/264,216, filed on Sep. 13, 2016, now Pat. No. 9,817,394, which is a continuation of application No. 14/989,738, filed on Jan. 6, 2016, now Pat. No. 9,758,246.

(51) Int. Cl.

| | | |
|---|---|---|
| *G05D 1/10* | (2006.01) | |
| *G06K 9/00* | (2022.01) | |
| *G06V 20/13* | (2022.01) | |
| *G06V 20/40* | (2022.01) | |
| *G06V 40/20* | (2022.01) | |
| *B64D 47/08* | (2006.01) | |

(52) U.S. Cl.
CPC ........... *G05D 1/0094* (2013.01); *G05D 1/101* (2013.01); *G06V 20/13* (2022.01); *G06V 20/41* (2022.01); *G06V 40/20* (2022.01); *B64C 2201/024* (2013.01); *B64C 2201/027* (2013.01); *B64C 2201/123* (2013.01); *B64C 2201/127* (2013.01); *B64C 2201/141* (2013.01); *B64C 2201/146* (2013.01); *B64D 47/08* (2013.01); *G06V 20/44* (2022.01)

(56) References Cited

U.S. PATENT DOCUMENTS

| | | | |
|---|---|---|---|
| 9,409,646 B2 | 8/2016 | Fleck | |
| 9,442,485 B1 | 9/2016 | McDermott | |
| 9,609,288 B1* | 3/2017 | Richman | G06Q 50/16 |
| 9,612,599 B2 | 4/2017 | Bradlow | |
| 9,769,387 B1 | 9/2017 | Beard | |
| 2006/0058928 A1* | 3/2006 | Beard | G05D 1/101 |
| | | | 244/175 |
| 2009/0153661 A1* | 6/2009 | Cheng | G06V 20/52 |
| | | | 348/143 |
| 2010/0250022 A1 | 9/2010 | Hines | |
| 2014/0062757 A1* | 3/2014 | Fox | G01S 13/867 |
| | | | 342/52 |
| 2015/0057917 A1 | 2/2015 | Cheng | |
| 2015/0116501 A1 | 4/2015 | McCoy | |
| 2015/0134143 A1 | 5/2015 | Willenborg | |
| 2015/0142211 A1 | 5/2015 | Shehata | |
| 2015/0166476 A1 | 6/2015 | Chen | |
| 2015/0205301 A1 | 7/2015 | Gilmore | |
| 2015/0304532 A1 | 10/2015 | Bart | |
| 2015/0324636 A1 | 11/2015 | Bentley | |
| 2015/0336015 A1 | 11/2015 | Blum | |
| 2015/0341547 A1* | 11/2015 | Petrescu | H04N 5/23218 |
| | | | 348/222.1 |
| 2015/0350614 A1* | 12/2015 | Meier | H04N 5/23229 |
| | | | 348/144 |
| 2015/0363648 A1* | 12/2015 | Li | G06V 20/49 |
| | | | 386/241 |
| 2015/0367958 A1 | 12/2015 | Lapstun | |
| 2015/0370250 A1 | 12/2015 | Bachrach | |
| 2016/0018822 A1 | 1/2016 | Nevdahs | |
| 2016/0031559 A1 | 2/2016 | Zang | |
| 2016/0054737 A1* | 2/2016 | Soll | G05D 1/0016 |
| | | | 701/3 |
| 2016/0076892 A1 | 3/2016 | Zhou | |
| 2016/0101856 A1 | 4/2016 | Kohstall | |
| 2016/0129999 A1 | 5/2016 | Mays | |
| 2016/0139596 A1 | 5/2016 | Na | |
| 2016/0139602 A1 | 5/2016 | Kohstall | |
| 2016/0161946 A1 | 6/2016 | Wuth Sepulveda | |
| 2016/0179096 A1 | 6/2016 | Bradlow | |
| 2016/0182850 A1* | 6/2016 | Thompson | H04N 9/8205 |
| | | | 348/158 |
| 2016/0189101 A1 | 6/2016 | Kantor | |
| 2016/0295108 A1 | 10/2016 | Cao | |
| 2016/0304198 A1 | 10/2016 | Jourdan | |
| 2016/0306351 A1 | 10/2016 | Fisher | |
| 2016/0307449 A1* | 10/2016 | Gordon | G05D 1/106 |
| 2016/0327950 A1 | 11/2016 | Bachrach | |
| 2016/0336020 A1 | 11/2016 | Bradlow | |
| 2016/0344981 A1 | 11/2016 | Lunt | |
| 2017/0031369 A1 | 2/2017 | Liu | |
| 2017/0053169 A1* | 2/2017 | Cuban | G06V 20/13 |
| 2017/0064181 A1 | 3/2017 | Zhang | |
| 2017/0097645 A1 | 4/2017 | Garland | |
| 2017/0102715 A1 | 4/2017 | Shi | |
| 2017/0108877 A1 | 4/2017 | Zang | |
| 2017/0118539 A1 | 4/2017 | Lokshin | |
| 2017/0123425 A1 | 5/2017 | Zhao | |
| 2017/0134631 A1 | 5/2017 | Zhao | |
| 2017/0161561 A1 | 6/2017 | Marty | |
| 2017/0227162 A1 | 8/2017 | Saika | |
| 2018/0188747 A1* | 7/2018 | Venturelli | G08G 5/0039 |
| 2018/0199025 A1 | 7/2018 | Holzer et al. | |
| 2018/0341812 A1 | 11/2018 | Floor | |
| 2018/0352144 A1 | 12/2018 | Miao | |
| 2018/0365839 A1 | 12/2018 | Feng | |
| 2019/0002104 A1 | 1/2019 | Kageyama | |

* cited by examiner

SYSTEMS AND METHODS FOR ADJUSTING FLIGHT CONTROL OF AN UNMANNED AERIAL VEHICLE

CROSS-REFERENCE TO RELATED APPLICATION(S)

This application is a continuation of U.S. patent application Ser. No. 15/807,399, filed Nov. 8, 2017, which is a continuation of U.S. patent application Ser. No. 15/264,216, filed on Sep. 13, 2016, now U.S. Pat. No. 9,817,394, which is a continuation of U.S. patent application Ser. No. 14/989,738, filed on Jan. 6, 2016, now U.S. Pat. No. 9,758,246, the entire disclosures of which are hereby incorporated by reference.

TECHNICAL FIELD

The disclosure relates to systems and methods for adjusting flight control of an unmanned aerial vehicle.

BACKGROUND

Unmanned aerial vehicles, or UAVs, may be equipped with automated flight control, remote flight control, programmable flight control, other types of flight control, and/or combinations thereof. Some UAVs may include sensors, including but not limited to, image sensors configured to capture image information. UAVs may be used to capture special moments, sporting events, concerts, etc. UAVs may be preconfigured with particular flight control settings. The preconfigured flight control settings may not be individualized for what is being captured. Configuration may take place through manual manipulation by the user. Adjustment of flight control settings may impact various aspects of images and/or videos captured by the image sensors of the UAV.

SUMMARY

The disclosure relates to adjusting flight control of an unmanned aerial vehicle based upon distances between the UAV and objects being captured by the UAV, in accordance with one or more implementations. Adjustment of flight control may facilitate enhanced capture when two or more objects become coincident in space and time. By determining distances between the UAV and the objects, the UAV may be controlled to be "in position" for capture of the coincidence of the objects. The objects may include a performer and a performee. By monitoring respective positions and/or distances of the performer and the performee with respect to the UAV, the UAV may be controlled to be prepared for movement of the performer and the performee toward each other for performance of the interaction between the performer and the performee.

The system for adjusting flight control of the UAV may include one or more of a housing, a flight control subsystem, one or more sensors, a sensor control subsystem, a controller interface, one or more physical processors, one or more computer program components, and/or other components. An individual subsystem may include one or more sensors, one or more physical processors, one or more computer program components, and/or other components.

Individual physical processors may be configured via computer-readable instructions to provide information-processing capabilities and/or execute computer program components. The computer program components may include one or more of a pattern recognition component, a distance component, a flight control component, a gesture recognition component, and/or other components.

The flight control subsystem may be configured to provide flight control for the UAV. By way of non-limiting example, the flight control subsystem may be configured to control one or more of an altitude, a longitude, a latitude, a geographical location, a heading, a speed of the UAV, and/or other flight controls. Operation of the flight control subsystem may be based upon flight control information. Flight control information may be based upon information determined and/or obtained to control the UAV. In some implementations, providing flight control may include functions including, but not limited to, flying the UAV in a stable manner, tracking people or objects, avoiding collisions, and/or other functions useful for autonomously flying unmanned aerial vehicles. In some implementations, flight control information may be transmitted by a remote controller. In some implementations, flight control information may be received by the controller interface by the remote controller.

One or more sensors may be configured to generate output signals conveying information. The information may include visual information, video information, audio information, geolocation information, orientation and/or motion information, depth information, and/or other information. Information captured by the one or more sensors may be marked, timestamped, annotated, and/or otherwise processed such that information captured by other sensors (e.g., other sensors from the one or more sensors of the UAV) may be synchronized, aligned, annotated, and/or otherwise associated therewith. In some implementations, the conveyed information may be related to one or more flight control information of the UAV. In some implementations, the conveyed information may be related to sensor control information. In some implementations, the conveyed information may be related to persons and/or objects near the UAV and/or the user.

The sensor control subsystem may be configured to control the one or more sensors included within the UAV and/or other sensors. By way of non-limiting example, the sensor control subsystem may be configured to control the one or more sensors through adjustments of one or more of aperture timing, exposure, focal length, angle of view, depth of field, focus, light metering, white balance, resolution, frame rate, object of focus, capture angle, a zoom parameter, video format, a sound parameter, a compression parameter, and/or other sensor parameters. Operation of the sensor control subsystem may be based upon sensor control information. Sensor control information may be based upon information and/or parameters determined and/or obtained by the UAV and/or components thereof. In some implementations, sensor control information may be transmitted by a remote controller. In some implementations, sensor control information may be received by the controller interface. In some implementations, the sensor control subsystem may be configured to control one or more image sensors such that the visual information captured by the one or more image sensors may include an image of a particular object or user.

The pattern recognition component may be configured to recognize a first pattern associated with a performer based on the visual information. The UAV, one of the processors included within the UAV, the remote controller, and/or other components configured to project a pattern may be configured to project the pattern on the performer. The performer may include a dynamic or moving object, person, place, and/or other performer. In some implementations, the pattern may be a visual pattern. For example, the pattern may include a barcode, a QR code, a target, and/or other patterns, and/or combinations thereof. In some implementations, the UAV, one of the processors included within the UAV, the remote controller, and/or other components configured to project the pattern may include and/or control a component configured to emit electromagnetic radiation. The electromagnetic radiation may produce the pattern (e.g., a visual pattern). In some implementations, particular information (including but not limited to commands, requests, targets, goals, etc.) may be embedded in the pattern. For example, flight control information and/or sensor control information may be entered, received, and/or confirmed through a user interface associated with the remote controller. This information may be converted to, embedded in, and/or otherwise processed into one or more patterns for projection.

The pattern recognition component may be configured to recognize a second pattern associated with a performee based on the visual information. The pattern recognition component may be configured to recognize the second pattern associated with the performee in a similar manner as discussed above. The first pattern and the second pattern may be different patterns and may be distinguishable by the pattern recognition component 20. The performee may include a static or non-moving object, person, place, and/or other performee. While the performer has been described as dynamic or moving and the performee has been described as static or non-moving, this is not meant to be a limitation of this disclosure, as the performer and the performee may both be dynamic (e.g., the performer and the performee may move at different, the same, and/or varying speeds) or may both be static.

The performer and the performee may be associated with one another. For example, the performer may be a skier. The skier may be marked with the first pattern (e.g., the first pattern is projected on the skier and/or the skier is wearing an identifying pattern). The skier may plan to perform a particular jump at or near the end of a ski slope. The particular location at or near the end of the ski slope where the skier may be performing the particular jump may be marked with the second pattern (e.g., the second pattern is projected at the location at or near the end of the ski slope and/or the location may be marked with an identifying pattern). In another example, a skateboarder may be marked with the first pattern. The skateboarder may plan to perform a particular trick at a location 50 yards from where the skateboarder begins skateboarding. The location at which the skateboarder plans to perform the particular trick may be marked with the second pattern.

The distance component may be configured to determine a first distance between the first pattern and the unmanned aerial vehicle. The first distance may represent a distance between the first pattern (e.g., the performer) and the UAV. For example, the distance component may be configured to determine an altitude of the UAV based upon one or more sensors (e.g., via an altimeter, an image sensor, a distance measurement sensor, etc.). Based upon the altimeter and/or other sensor/device configured to determine measurements of distance, the distance component may be configured to determine the first distance between the first pattern and the unmanned aerial vehicle. The distance component may be configured to determine a second distance between the second pattern (e.g., the performee) and the unmanned aerial vehicle in a similar manner as discussed above.

The flight control component may be configured to adjust the flight control of the unmanned aerial vehicle based upon the first distance and the second distance. The UAV may be configured to capture a video segment including the performer and the performee within a single field of view of an image capturing device of the UAV. The UAV may be configured to maintain a particular distance from the second pattern (e.g., the performee) in preparation for the first pattern (e.g., the performer) approaching the second pattern. The UAV may hover in a location such that the performer and the performee may both be simultaneously captured within the field of view while the UAV 100 remains closer to the second pattern than the first pattern (e.g., the second distance is less than the first distance). For example, patterns (e.g., the first pattern and the second pattern) may include information embedded within them. The embedded information may include commands, requests, targets, and/or goals for the operation of the UAV, including but not limited to flight control information and/or sensor control information. The flight control component may be configured to adjust the flight control such that one or more of a target altitude differential, a target cardinal direction, and/or a target distance is maintained between the unmanned aerial vehicle and the first pattern based upon the first distance and the second distance.

The gesture recognition component may be configured to recognize and/or interpret gestures from the performer. In some implementations, gestures may be recognized and/or interpreted by capturing depth information that includes the performer and analyzing patterns, positions, and/or movements of the performer, or parts of the body of the performer. By way of non-limiting example, the gesture recognition component may be configured to determine and/or recognize one or more patterns, positions, and/or movements of the hands of the performer. In some implementations, individual particular patterns, positions, and/or movements of the hands of the performer may correspond to particular commands and/or requests to the UAV to perform an action or operation. Performance of an action or operation by the UAV and/or components thereof may correspond to one or both of flight control information and sensor control information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
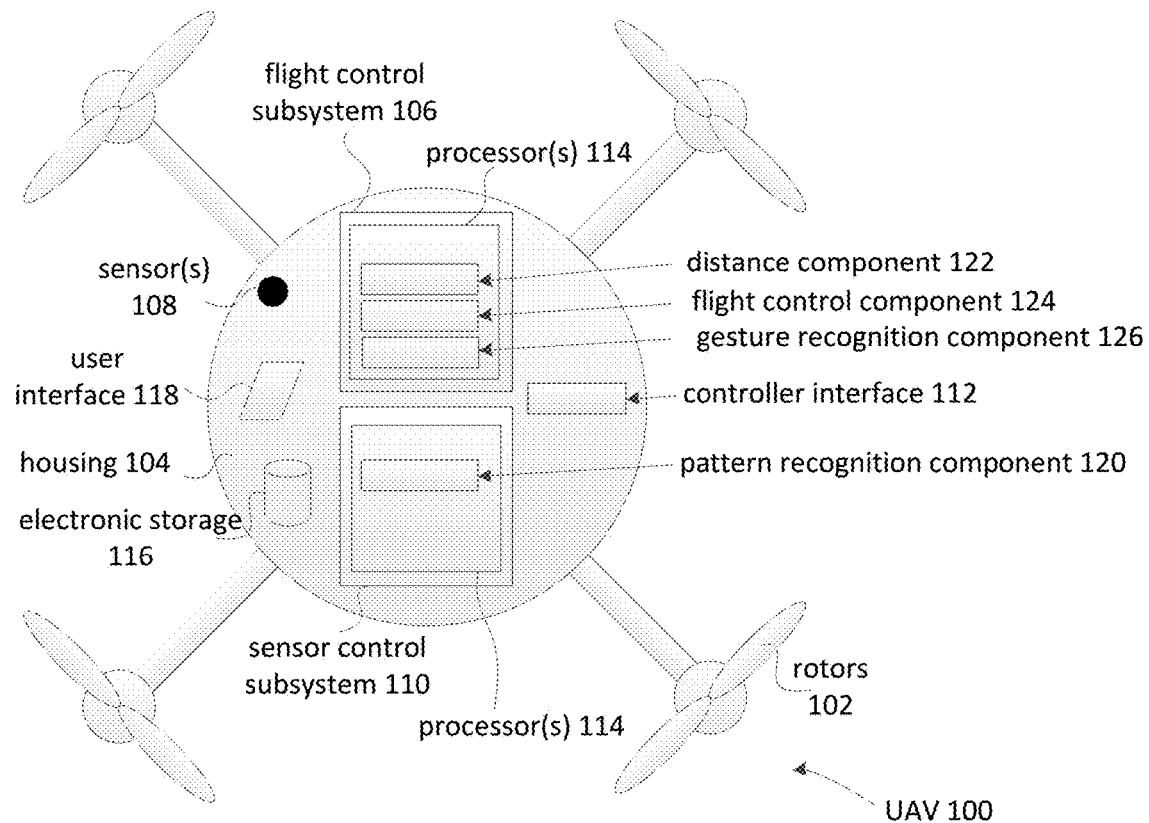
FIG. 1 illustrates a system for adjusting flight control of an unmanned aerial vehicle, in accordance with one or more implementations.

FIG. 1 schematically illustrates an unmanned aerial vehicle 100 (also referred to as UAV 100), in particular a quadcopter. This quadcopter is an exemplary and non-limiting implementation of a UAV. The term "unmanned" may refer to the capability of the aerial vehicle to operate without requiring a human operator during a flight. At least some portion of the flight control may be provided remotely and/or by an autopilot (also referred to as a control system or a control subsystem or a flight control subsystem). In some implementations, UAVs may carry passengers, cargo, sensors, and/or other physical objects. In some implementations, UAVs may operate autonomously. Alternatively, and/or simultaneously, in some implementations, at least some functionality of UAVs may be controlled and/or modified through a remote control (e.g., by a user) for at least some portion of a flight. For example, the user may control and/or assist remotely in a particular maneuver, such as a take-off or landing.

UAVs may be a fixed wing aircraft, a helicopter, a multi-rotor aircraft (e.g. a quadcopter), a rotary wing aircraft, and/or another type of aircraft. In some implementations, UAVs may combine features of multiple types of aircraft. UAVs may include one or more components configured to provide lift force. By way of a non-limiting example, the one or more components providing lift force may include one or more wings, airfoils, propellers, rotors, rotor discs, and/or other components.

Autonomous operation and remote control operation may be provided during the same flight. By way of non-limiting example, the modes of operation of UAVs may include autonomous operation, remote control operation, combinations thereof, and/or other modes of operation. UAVs may have varying degrees of autonomy.

A control system may provide one or more of stabilization control, navigation control, altitude control, propulsion control, engine control, and/or other functions needed and/or used during operation of UAVs, which may jointly be referred to as flight control. By way of non-limiting example, UAVs may be configured to provide one or more of the following functions: capture and/or interpret visual information, ground imagery, and/or surrounding imagery, capture and/or interpret sensor data (e.g. radar data), plan a path for UAVs, determine one or more maneuvers to follow or maintain a particular path and/or other goal or target, to reach a particular destination, or to accomplish a goal or target, avoid obstacles and/or collisions, accommodate in-flight instructions (e.g. from a user and/or a control tower or similar authority), coordinate with external agents (e.g. other UAVs), and/or other functions.

In some implementations, UAVs may be controlled by a system that supports multiple modes of autonomous operation and/or multiple modes of remote control operation.

As illustrated in FIG. 1, UAV 100 may include four rotors 102. The number of rotors 102 of UAV 100 is not intended to be limited by any way, as any number of rotors 102 are possible. UAV 100 may include one or more of housing 104, flight control subsystem 106, one or more sensors 108, sensor control subsystem 110, controller interface 112, one or more physical processors 114, electronic storage 116, user interface 118, and/or other components.

Housing 104 may be configured to support, hold, and/or carry UAV 100 and/or components thereof.

Flight control subsystem 106 may include one or more physical processors 114, and/or other components. Sensor control subsystem 106 may include one or more physical processors 114, and/or other components. The depiction in FIG. 1 of a single sensor 108 is not intended to be limiting in any way, as UAV 100 may include any number of sensors.

Flight control subsystem 106 may be configured to provide flight control for UAV 100. By way of non-limiting example, flight control subsystem 106 may be configured to control one or more of an altitude, a longitude, a latitude, a geographical location, a heading, a speed of UAV 100, and/or other flight controls. Operation of flight control subsystem 106 may be based upon flight control information. Flight control information may be based upon information determined and/or obtained to control UAV 100. In some implementations, providing flight control may include functions including, but not limited to, flying UAV 100 in a stable manner, tracking people or objects, avoiding collisions, and/or other functions useful for autonomously flying unmanned aerial vehicles. In some implementations, flight control information may be transmitted by remote controller 202, as will be discussed in further detail in reference to FIG. 2. In some implementations, flight control information may be received by controller interface 112 by remote controller 202.

One or more sensors 108 may be configured to generate output signals conveying information. The information may include visual information, video information, audio information, geolocation information, orientation and/or motion information, depth information, and/or other information. Information captured by one or more sensors 108 may be marked, timestamped, annotated, and/or otherwise processed such that information captured by other sensors (e.g., other sensors from one or more sensors 108 of UAV 100) may be synchronized, aligned, annotated, and/or otherwise associated therewith. In some implementations, the conveyed information may be related to one or more flight control information of UAV 100. In some implementations, the conveyed information may be related to sensor control information. In some implementations, the conveyed information may be related to persons and/or objects near UAV 100 and/or the user. One or more sensors 108 may include one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors.

Sensor control subsystem 110 may be configured to control one or more sensors 108 included within UAV 100 and/or other sensors. By way of non-limiting example, sensor control subsystem 110 may be configured to control one or more sensors 108 through adjustments of one or more of aperture timing, exposure, focal length, angle of view, depth of field, focus, light metering, white balance, resolution, frame rate, object of focus, capture angle, a zoom parameter, video format, a sound parameter, a compression parameter, and/or other sensor parameters. Operation of sensor control subsystem 110 may be based upon sensor control information. Sensor control information may be based upon information and/or parameters determined and/or obtained by UAV 100 and/or components thereof. In some implementations, sensor control information may be transmitted by remote controller 202 from FIG. 2. In some implementations, sensor control information may be received by controller interface 112. In some implementations, sensor control subsystem 110 may be configured to control one or more image sensors 108 such that the visual information captured by one or more image sensors 108 may include an image of a particular object or user.

Figure 2:
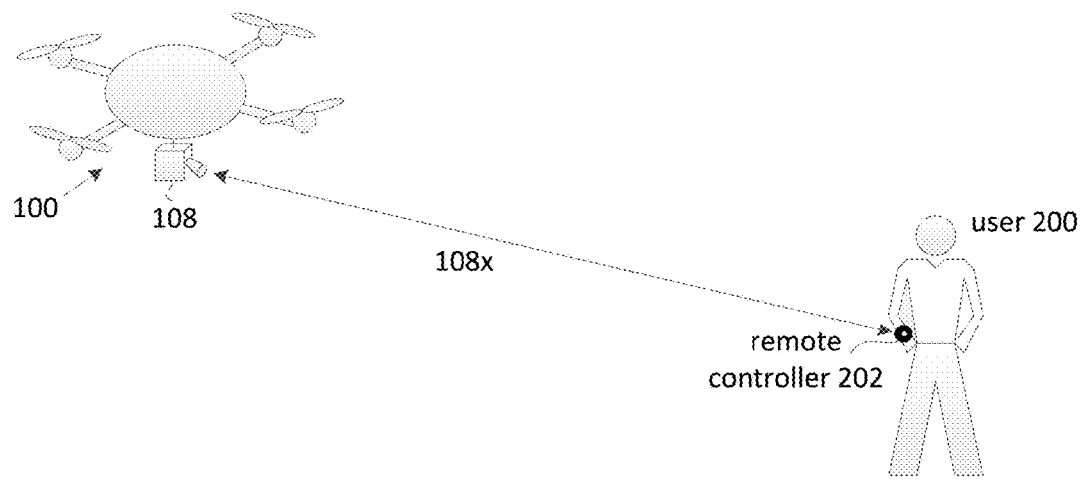
FIG. 2 illustrates a scene including an unmanned aerial vehicle and a user, in accordance with one or more implementations.

By way of non-limiting example, FIG. 2 illustrates a scene including UAV 100 and user 200. Sensor 108 of UAV 100 is aimed in a direction as indicated by direction 108x to capture visual information that includes user 200. User 200 may include remote controller 202 (e.g., user 200 may be holding remote controller 202, wearing remote controller 202, etc.). Remote controller 202 may be configured to transmit information to UAV 100 (e.g., in a direction as indicated by direction 108x). In some implementations, remote controller 202 may operate as a beacon to guide UAV 100. Remote controller 202 may be configured to transmit information, including but not limited to flight control information, sensor control information, and/or other information. In some implementations, remote controller 202 may be a separate, distinct, and/or physically independent component of UAV 100. In some implementations, remote controller 202 may be a separate, distinct, and/or physically independent component from housing 104 (as shown in FIG. 1). In some implementations, remote controller 202 may be configured to be supported, worn, held, and/or carried by a user 200. In some implementations, remote controller 202 may include a user interface (e.g., user interface 118 from FIG. 1) configured to receive user input. The user input may include flight control information, sensor control information, and/or other information. In some implementations, the user input may include gestures by a user, as will be discussed in further detail below. In some implementations, gesture recognition component 126 from FIG. 1 may be included within remote controller 202.

Referring back to FIG. 1, controller interface 112 may be configured to determine and/or receive flight control information, sensor control information, and/or other information. For example, controller interface 112 may be configured to receive flight control information and/or sensor control information from a remote controller (e.g., remote controller 202 from FIG. 2). In some implementations, controller interface 112 may be included, combined, embedded, and/or otherwise form an integral part of UAV 100 and/or housing 104.

One or more physical processors 114 may be configured via computer-readable instructions to provide information-processing capabilities and/or execute computer program components. The computer program components may include one or more of a pattern recognition component 120, a distance component 122, a flight control component 124, a gesture recognition component 126, and/or other components. As depicted in FIG. 1, UAV 100 may include two separate instances of physical processor 114 that are included in flight control subsystem 106 and in sensor control subsystem 110. The number of physical processors 114 is not intended to be limited in any way by the depiction in FIG. 1. The partitioning of physical processors 114 under any component of UAV 100 or any control subsystem is not intended to be limited in any way by the depiction in FIG. 1.

Pattern recognition component 120 may be configured to recognize a first pattern associated with a performer based on the visual information. UAV 100, one of processors 114 included within UAV 100, remote controller 202, and/or other components configured to project a pattern may be configured to project the pattern on the performer. The performer may include a dynamic or moving object, person, place, and/or other performer. The performer may be the same as user 200 of FIG. 2 and/or may be a different person or object. In some implementations, the pattern may be a visual pattern. For example, the pattern may include a barcode, a QR code, a target, and/or other patterns, and/or combinations thereof. In some implementations, UAV 100, one of processors 114 included within UAV 100, remote controller 202, and/or other components configured to project the pattern may include and/or control a component configured to emit electromagnetic radiation. The electromagnetic radiation may produce the pattern (e.g., a visual pattern). In some implementations, particular information (including but not limited to commands, requests, targets, goals, etc.) may be embedded in the pattern. For example, flight control information and/or sensor control information may be entered, received, and/or confirmed through a user interface associated with remote controller 202 of FIG. 2. This information may be converted to, embedded in, and/or otherwise processed into one or more patterns for projection.

Pattern recognition component 120 may be configured to recognize and/or interpret patterns, including but not limited to patterns projected by UAV 100, one of processors 114 included within UAV 100, remote controller 202, and/or other components configured to project the pattern. By way of non-limiting example, patterns may be interpreted as one or both of flight control information and sensor control information. For example, a pattern may be used to tag the performer (e.g., object or person) such that, subsequent to being tagged, UAV 100 may be configured to follow and/or track the tagged performer (e.g., object or person). In some implementations, features attributed to pattern recognition component 120 may be performed at or near user 200 and/or another user. In some implementations, features attributed to pattern recognition component 120 may be performed at or near UAV 100 and/or components thereof. In some implementations, features attributed to pattern recognition component 120 may be performed in part at or near user 200 and/or another user, and in part at or near UAV 100 and/or components thereof.

Pattern recognition component 120 may be configured to recognize a second pattern associated with a performee based on the visual information. Pattern recognition component 120 may be configured to recognize the second pattern associated with the performee in a similar manner as discussed above. The first pattern and the second pattern may be different patterns and may be distinguishable by pattern recognition component 120. The performee may include a static or non-moving object, person, place, and/or other performee. While the performer has been described as dynamic or moving and the performee has been described as static or non-moving, this is not meant to be a limitation of this disclosure, as the performer and the performee may both be dynamic (e.g., the performer and the performee may move at different, the same, and/or varying speeds) or may both be static.

The performer and the performee may be associated with one another. For example, the performer may be a skier. The skier may be marked with the first pattern (e.g., the first pattern is projected on the skier and/or the skier is wearing an identifying pattern). The skier may plan to perform a particular jump at or near the end of a ski slope. The particular location at or near the end of the ski slope where the skier may be performing the particular jump may be marked with the second pattern (e.g., the second pattern is projected at the location at or near the end of the ski slope and/or the location may be marked with an identifying pattern). In another example, a skateboarder may be marked with the first pattern. The skateboarder may plan to perform a particular trick at a location 50 yards from where the skateboarder begins skateboarding. The location at which the skateboarder plans to perform the particular trick may be marked with the second pattern.

Distance component 122 may be configured to determine a first distance between the first pattern and the unmanned aerial vehicle. The first distance may represent a distance between the first pattern (e.g., the performer) and UAV 100. For example, distance component 122 may be configured to determine an altitude of UAV 100 based upon one or more sensors 108 (e.g., via an altimeter, an image sensor, a distance measurement sensor, etc.). Based upon the altimeter and/or other sensor/device configured to determine measurements of distance, distance component 122 may be configured to determine the first distance between the first pattern and the unmanned aerial vehicle. Distance component 122 may be configured to determine a second distance between the second pattern (e.g., the performee) and the unmanned aerial vehicle in a similar manner as discussed above.

Flight control component 124 may be configured to adjust the flight control of the unmanned aerial vehicle based upon the first distance and the second distance. UAV 100 may be configured to capture a video segment including the performer and the performee within a single field of view of an image capturing device of UAV 100. UAV 100 may be configured to maintain a particular distance from the second pattern (e.g., the performee) in preparation for the first pattern (e.g., the performer) approaching the second pattern. UAV 100 may hover in a location such that the performer and the performee may both be simultaneously captured within the field of view while the UAV 100 remains closer to the second pattern than the first pattern (e.g., the second distance is less than the first distance). For example, patterns (e.g., the first pattern and the second pattern) may include information embedded within them. The embedded information may include commands, requests, targets, and/or goals for the operation of UAV 100, including but not limited to flight control information and/or sensor control information. For example, pattern recognition component 120 may recognize and interpret the first pattern on the performee as requiring a wide-angle high-resolution panning capture as the first distance approaches the length of the second distance (e.g., as the first distance decreases). Flight control component 124 may adjust the flight control accordingly. In another example, pattern recognition component 120 may recognize and interpret the second pattern on performee as requiring a slow-motion video capture as the first pattern and the second pattern overlap. Flight control component 124 may adjust the flight control accordingly. In some implementations, information may be sent from remote controller 202 to controller interface 112 by a combination of direct transmission and projected patterns that are recognized and interpreted upon being captured by an image sensor.

Flight control component 124 may be configured to adjust the flight control such that one or more of a target altitude differential, a target cardinal direction, and/or a target distance is maintained between the unmanned aerial vehicle and the first pattern based upon the first distance and the second distance. As discussed above, the target altitude differential, the target cardinal direction, and/or the target distance may be embedded within the first pattern and/or the second pattern. For example, a current cardinal direction may be that UAV 100 is positioned East of the first pattern and the second pattern. Subsequent to the first distance decreasing and/or increasing in length, UAV 100 may maneuver itself such that UAV 100 is positioned South of the first pattern and the second pattern such that the target cardinal direction is maintained. In some implementations, flight control component 124 may be configured to adjust the flight control of UAV 100 by a predetermined number of degrees around the first pattern based upon varying lengths of the first distance and/or the second distance. The flight control may be adjusted such that one or more of the target altitude differential, the target cardinal direction, and/or the target distance is maintained between the unmanned aerial vehicle and the second pattern based upon the first distance and the second distance in a similar manner as discussed above.

Figure 3A:
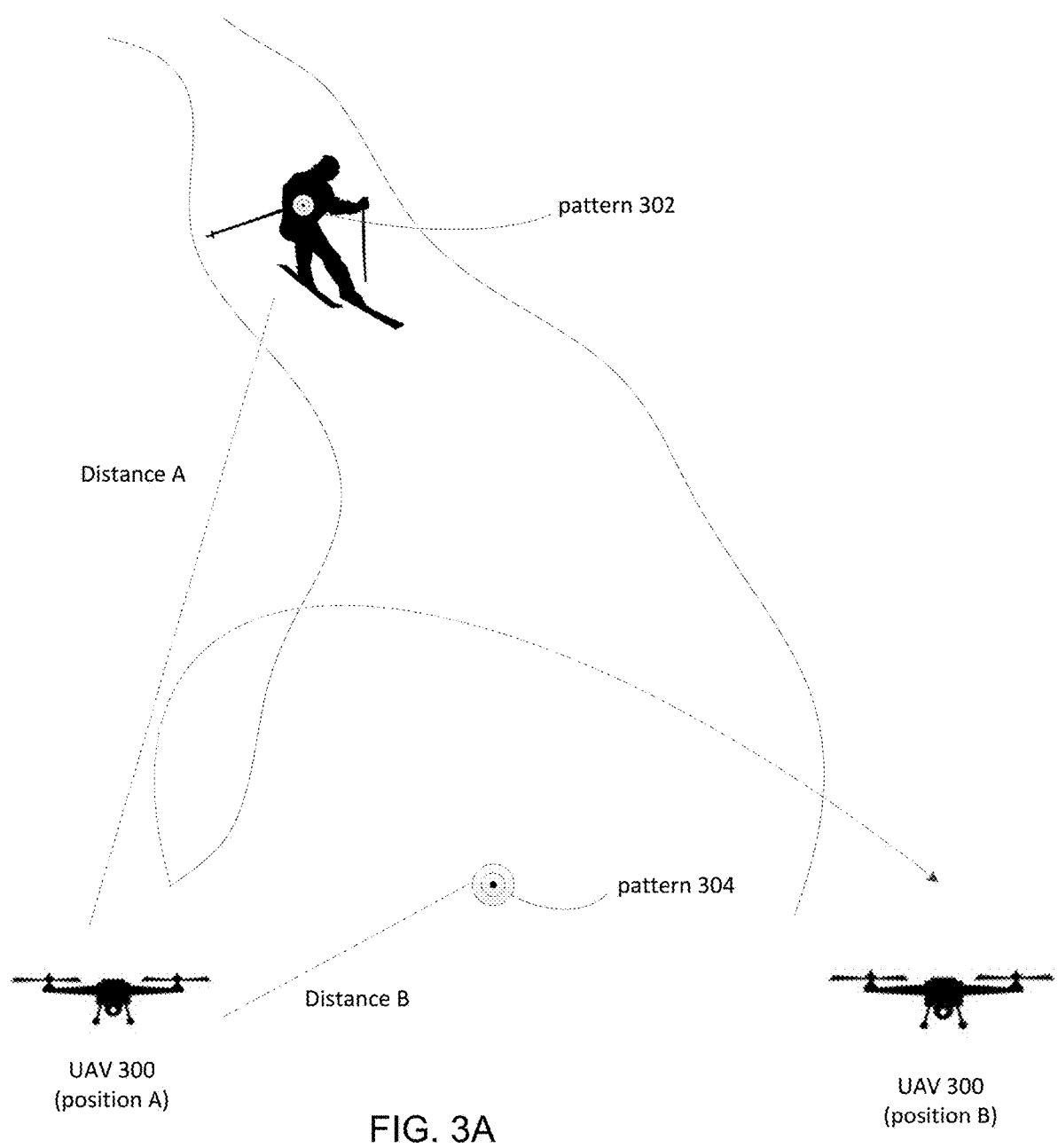
FIGS. 3A-3B illustrate adjusting flight control of an unmanned aerial vehicle based upon a first pattern and a second pattern in accordance with one or more implementations.

By way of non-limiting example, FIG. 3A illustrates a scene including UAV 100, a first pattern 302, and second pattern 304. First pattern 302 and/or second pattern 304 may be projected (via a remote controller, UAV 100, or other device) and/or may be applied to the performer (e.g., the skier) and/or performee (e.g., the ski slope) in another manner (e.g., a sticker, etc.). Pattern recognition component 120 (which may be integrated in UAV 100) may recognize first pattern 302 and second pattern 304. For example, pattern recognition component 120 may be configured to analyze visual information captured by image sensor 108 (shown in FIG. 1). The captured visual information may include images of first pattern 302 and second pattern 304. First pattern 302 and/or second pattern 304 may be interpreted as a command and/or request to UAV 100 to perform an action or operation related to first pattern 302 (e.g., first pattern 302 associated with the skier) and/or second pattern 304 (e.g., second pattern 304 associated with a particular location on the ski slope where a particular action or performance may take place). Distance component 122 may be configured to determine a first distance (e.g., distance A) between UAV 100 and first pattern 302. Distance component 122 may be configured to determine a second distance (e.g., distance B) between UAV 100 and second pattern 304. UAV 100 may be configured to capture visual information (via one or more sensors 108 of FIG. 1) that includes images and/or a video segment of both first pattern 302 and second pattern 304 in the same field of view. While distance A is larger than a predefined distance, UAV 100 may be configured to capture visual information including both the performer and the performee in the same field of view with a wide-angle point of view at an altitude of 20 feet. As distance A becomes shorter (e.g., is a predefined distance) and/or as distance A reaches the length of Distance B, flight control component 124 may be configured to adjust the flight controls of UAV 100 such that UAV 100 re-positions from position A to position B and to adjust the sensor controls such that UAV 100 may capture the overlap of pattern 302 and pattern 304 on the East side of the ski slope with a high-resolution, slow-motion, close-up video segment in order to capture the action and/or performance (e.g., a jump at the end of the ski slope) at pattern 304 when the performer (e.g., the skier) associated with pattern 302 collides with pattern 304. UAV 100 may continue capturing the images and/or video segment as UAV 100 travels from position A to position B in order to capture various angles of the performer associated with pattern 302 approaching pattern 304 during the flight path of UAV 100.

Returning to FIG. 1, gesture recognition component 126 may be configured to recognize and/or interpret gestures from the performer, including but not limited to user 200 of FIG. 2. In some implementations, gestures may be recognized and/or interpreted by capturing depth information that includes the performer and analyzing patterns, positions, and/or movements of the performer, or parts of the body of the performer. By way of non-limiting example, gesture recognition component 126 may be configured to determine and/or recognize one or more patterns, positions, and/or movements of the hands of the performer. In some implementations, individual particular patterns, positions, and/or movements of the hands of the performer may correspond to particular commands and/or requests to UAV 100 to perform an action or operation. Performance of an action or operation by UAV 100 and/or components thereof may correspond to one or both of flight control information and sensor control information. Performance of an action or operation by UAV 100 and/or components thereof may be implemented by one or more of flight control subsystem 106, sensor control system 110, and/or other components of UAV 100. By way of non-limiting example, gestures may be interpreted as one or both of flight control information and sensor control information. In some implementations, features attributed to gesture recognition component 126 may be performed at or near the first pattern and/or the second pattern. In some implementations, features attributed to gesture recognition component 126 may be performed at or near UAV 100 and/or components thereof. In some implementations, features attributed to gesture recognition component 126 may be performed in part at or near the first pattern and/or the second pattern, and in part at or near UAV 100 and/or components thereof.

One or more gestures associated with the performer may be interpreted to adjust one or more of the target altitude differential, the target cardinal direction, and/or the target distance between the unmanned aerial vehicle and the first pattern. For example, a gesture by performer (e.g., a skateboarder) crouching low to his or her skateboard and/or grabbing his or her skateboard may indicate a command and/or request for UAV 100 to decrease its altitude and/or zoom into the performer, as the gesture may indicate that an important trick that the performer is about to perform is approaching. Such a command and/or request may correspond to flight control information that may be used by flight control subsystem 106 to control the position and/or movement of UAV 100.

One or more gestures associated with the performer may be interpreted to adjust one or more of the target altitude differential, the target cardinal direction, and/or the target distance between the unmanned aerial vehicle and the second pattern. For example, a gesture by the performer of moving both hands from being outstretched and vertical to horizontal and pointing to the second pattern may indicate a command and/or request for UAV 100 to decrease the second distance such that UAV 100 is closer to the second pattern. A gesture by the performer of aiming, poking, and/or thrusting toward an object or person may indicate a command and/or request for UAV 100 to follow and/or track that particular object and/or person instead of the performer. Gestures described in this disclosure are merely exemplary and not intended to be limiting in any way.

In some implementations, gestures may be accompanied by other types of user input, including but not limited to an auditory command, a manipulation of a user interface element (e.g., a button or switch), a tactile action (e.g. tapping a remote controller twice to prime the system for recognizing a gesture), and/or other types of user input. As used in this disclosure, gestures, interpretations, commands, and requests are types of information that may be transmitted by remote controller 202, received by controller interface 112, and/or processed by one or more control subsystems and/or computer program components in other ways.

In some implementations, one or more gestures may be interpreted to adjust the zooming factor of sensor 108 (e.g., an image sensor) to capture a wider shot or a narrower shot of the first pattern and/or the second pattern. Such a command and/or request to adjust the zooming factor may correspond to sensor control information that may be used by sensor control subsystem 110 to control the operation of one or more sensors 108.

One or more processors 114 may be configured to mark the video segment at a point in time in which a third distance between the first pattern and the second pattern is a predefined distance. The third distance may represent a distance between the first pattern and the second pattern. For example, as described above, the first pattern may be associated with the performer (e.g., a dynamic and/or moving object or person). The third distance may vary as the first pattern approaches the second pattern associated with the performee (e.g., a static and/or non-moving object or person). For example, as a skier approaches the particular location on a ski slope where the skier may perform a jump, the third distance may decrease in length. One or more processors 114 may tag and/or mark the visual information (e.g., captured via one or more sensors 108) while capturing the visual information (e.g., one or more processors 114 may tag and/or mark the video segment in or near real-time) at the point in time in which the third distance is the predefined distance (e.g., when the first pattern and the second pattern are a predefined distance apart). The predefined distance may be a manually entered predefined distance and/or may be preconfigured by one or more processors 114. The predefined distance may be determined based upon the performer and/or performee (e.g., the action of which the performer is performing, etc.). The tag and/or mark may indicate the point in time during the video segment in which an event may take place in a relatively short time period after the tag and/or mark. During playback of the video segment, a user may quickly jump to the tag and/or mark within the video segment to locate the event within the video segment. The event may be the overlap of the first pattern and the second pattern (e.g., the point in which the performer reaches the performee). The third distance may indicate that the first pattern and the second pattern may overlap in a relatively short time period after the point in time in which the video segment is tagged and/or marked.

One or more processors 114 may be configured to mark the video segment at a point in time in which the first pattern and the second pattern overlap. This may be in addition to the tag and/or mark associated with the third distance, as discussed above, or may be the only tag and/or mark within the captured video segment. The tag and/or mark may indicate the point in time during the video segment in which the event may take place. During playback of the video segment, the user may quickly jump to the tag and/or mark within the video segment to locate the event within the video segment. The event may be the overlap of the first pattern and the second pattern (e.g., the point in which the performer reaches the performee).

In some implementations, one or more gestures may be interpreted as meta-information regarding the information being captured by one or more sensors 108. For example, a particular gesture may indicate to one or more processors 114 to mark, tag, timestamp, annotate, and/or otherwise process visual information captured by one or more sensors 108 in or near real-time. In some implementations, a particular gesture may be used to synchronize, align, annotate, and/or otherwise associate captured visual information with a particular person, object, moment, and/or duration/event.

Figure 3B:
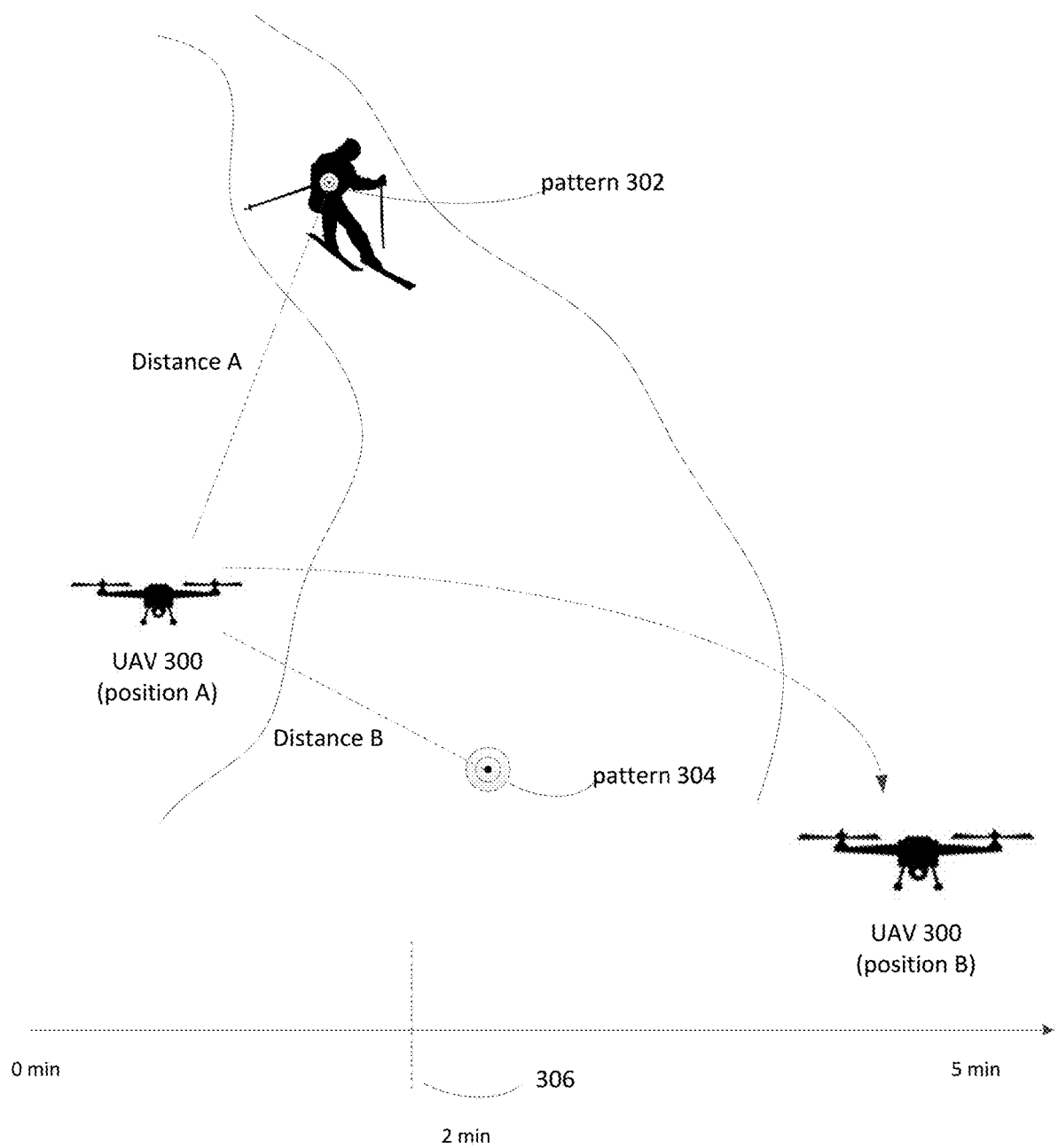

Continuing the example above from FIG. 3A, FIG. 3B illustrates one or more processors (not shown in FIG. 3B) marking the captured video segment at tag 306 in or near real-time while capturing the video segment of the performer and the performee. For example, UAV 100 may mark and/or tag the video segment when first pattern 302 is a predefined distance apart from second pattern 304 (e.g., as shown in FIG. 3B, UAV 100 may mark the video segment at 2 minutes, as indicated by tag 306). UAV 100 may mark and/or tag the video segment at the point in time when first pattern 302 and second pattern 304 overlap. UAV 100 may mark and/or tag the video segment if gesture recognition component 126 recognizes a particular gesture by the performer associated with pattern 302 and/or another user indicating an action to mark and/or tag the video segment while capturing the visual information at that point in time. In this manner, a user may jump to tag 306 to quickly view the action and/or performance that may take place when first pattern 302 and second pattern 304 overlap and/or collide.

The depiction in FIG. 1 of flight control subsystem 106 including and/or executing distance component 122, flight control component 124, and/or gesture recognition component 126 is not intended to be limiting in any way. In some implementations, distance component 122, flight control component 124, and/or gesture recognition component 126 may be included in and/or executed by sensor control subsystem 110 and/or any other component of UAV 100. Similarly, the depiction in FIG. 1 of sensor control subsystem 110 including and/or executing pattern recognition component 120 is not intended to be limiting in any way. In some implementations, pattern recognition component 120 may be included in and/or executed by flight control subsystem 106 and/or any other component of UAV 100. The location or depiction of a particular computer program component in FIG. 1 is merely exemplary, and not intended to be limiting in any way.

One or more physical processors 114 may include one or more of a digital processor, an analog processor, a digital circuit designed to process information, a central processing unit, a graphics processing unit, an analog circuit designed to process information, and/or other mechanisms for electronically processing information. In some implementations, physical processor 114 may include a plurality of processing units.

It should be appreciated that although components 120, 122, 124, and 126 are illustrated in FIG. 1 as being located and/or co-located within a particular component of UAV 10, in implementations in which physical processor 114 includes multiple processing units, one or more of components 120, 122, 124, and/or 126 may be located remotely from the other components. The description of the functionality provided by the different components 120, 122, 124, and/or 126 described herein is for illustrative purposes, and is not intended to be limiting, as any of components 120, 122, 124, and/or 126 may provide more or less functionality than is described. For example, one or more of components 120, 122, 124, and/or 126 may be eliminated, and some or all of its functionality may be incorporated, shared, integrated into, and/or otherwise provided by other ones of components 120, 122, 124, and/or 126. Note that physical processor 114 may be configured to execute one or more additional components that may perform some or all of the functionality attributed below to one of components 120, 122, 124, and/or 126.

Electronic storage 116 in FIG. 1 may comprise electronic storage media that electronically stores information. The electronic storage media of electronic storage 116 may include one or both of system storage that is provided integrally (i.e., substantially non-removable) with UAV 100 and/or removable storage that is connectable to UAV 100 via, for example, a port (e.g., a USB port, a Firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 116 may store software algorithms, information determined by physical processor 114 or any computer program components, information received via user interface 118, and/or other information that enables UAV 100 to function properly. For example, electronic storage 116 may store captured visual information (as discussed elsewhere herein), and/or other information. Electronic storage 116 may be a separate component within UAV 100, or electronic storage 116 may be provided integrally with one or more other components of UAV 100 (e.g., physical processor 114).

User interface 118 of UAV 100 in FIG. 1 may be configured to provide an interface between UAV 100 and a user (e.g. a remote user using a graphical user interface) through which the user can provide information to and receive information from UAV 100. This may enable data, results, and/or instructions and any other communicable items, collectively referred to as "information," to be communicated between the user and UAV 100. Examples of interface devices suitable for inclusion in user interface 118 include a keypad, buttons, switches, a keyboard, knobs, levers, a display screen, a touch screen, speakers, a microphone, an indicator light, an audible alarm, and a printer. Information may be provided to a user by user interface 118 in the form of auditory signals, visual signals, tactile signals, and/or other sensory signals.

It is to be understood that other communication techniques, either hard-wired or wireless, are also contemplated herein as user interface 118. For example, in one embodiment, user interface 118 may be integrated with a removable storage interface provided by electronic storage 116. In this example, information is loaded into UAV 100 from removable storage (e.g., a smart card, a flash drive, a removable disk, etc.) that enables the user(s) to customize UAV 100. Other exemplary input devices and techniques adapted for use with UAV 100 as user interface 118 may include, but are not limited to, an RS-232 port, RF link, an IR link, modem (telephone, cable, Ethernet, internet or other). In short, any technique for communicating information with UAV 100 may be contemplated as user interface 118.

Figure 4:
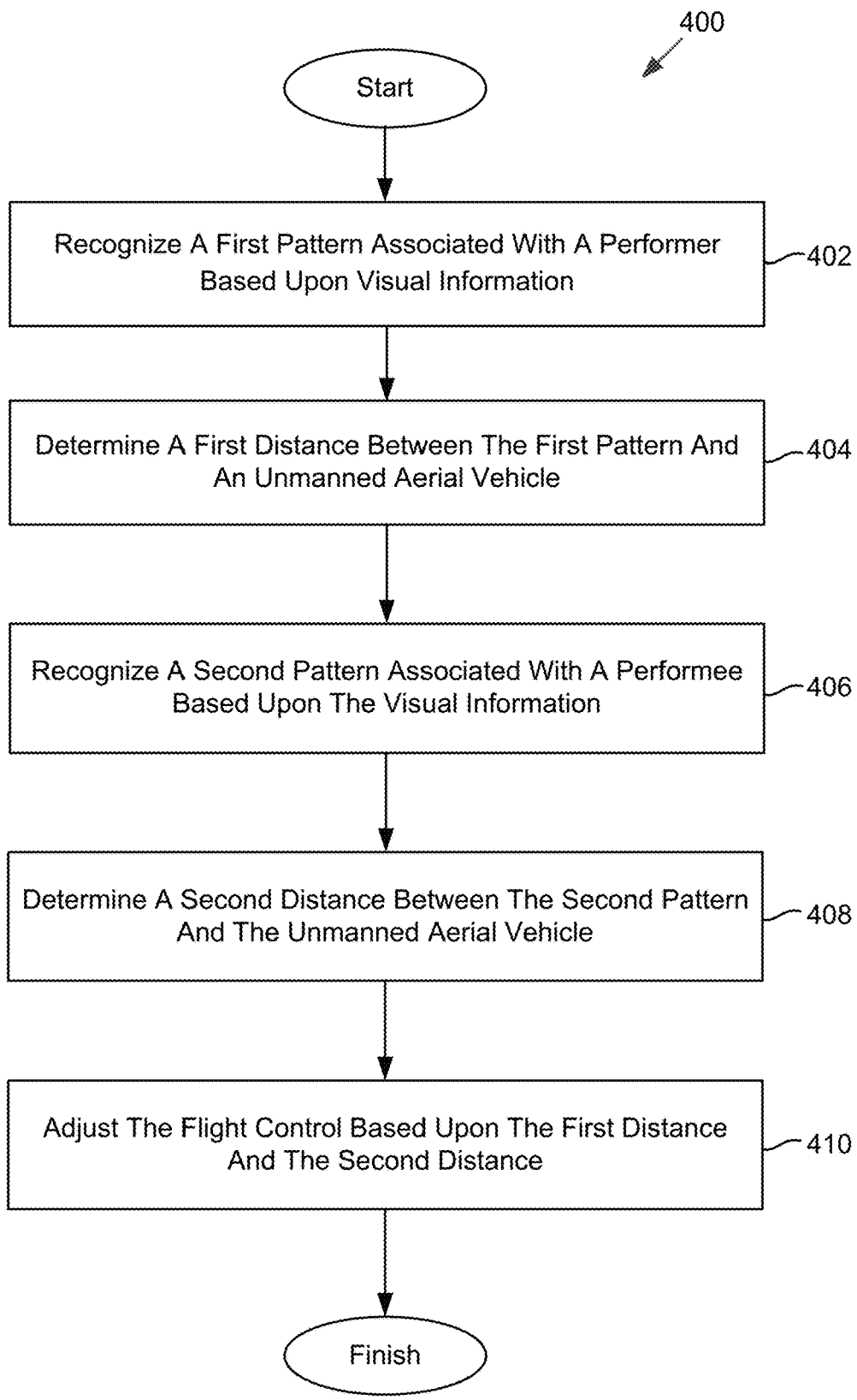
FIG. 4 illustrates a method for adjusting flight control of an unmanned aerial vehicle, in accordance with one or more implementations.

FIG. 4 illustrates a method 400 for adjusting flight control of an unmanned aerial vehicle. The operations of method 400 presented below are intended to be illustrative. In certain implementations, method 400 may be accomplished with one or more additional operations not described, and/or without one or more of the operations discussed. Additionally, the order in which the operations of method 400 are illustrated in FIG. 4 and described below is not intended to be limiting.

In certain implementations, method 400 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Regarding method 400, at an operation 402, a first pattern associated with a performer may be recognized based upon visual information. In some embodiments, operation 402 may be performed by a pattern recognition component that is the same as or similar to pattern recognition component 120 (shown in FIG. 1 and described herein).

At an operation 404, a first distance between the first pattern and the unmanned aerial vehicle may be determined. In some embodiments, operation 402 may be performed by a distance component that is the same as or similar to distance component 122 (shown in FIG. 1 and described herein).

At an operation 406, a second pattern associated with a performee may be recognized based upon visual information. In some embodiments, operation 406 may be performed by a pattern recognition component that is the same as or similar to pattern recognition component 120 (shown in FIG. 1 and described herein).

At an operation 408, a second distance between the second pattern and the unmanned aerial vehicle may be determined. In some embodiments, operation 408 may be performed by a distance component that is the same as or similar to distance component 122 (shown in FIG. 1 and described herein).

At an operation 410, the flight control may be adjusted based upon the first distance and the second distance. In some embodiments, operation 410 is performed by a flight control component the same as or similar to flight control component 124 (shown in FIG. 1 and described herein).

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for adjusting flight control of an unmanned aerial vehicle, the system comprising:
    an image sensor carried by the unmanned aerial vehicle, the image sensor configured to generate output signals conveying visual information;
    one or more physical processors configured by computer-readable instructions to:
        provide the flight control for the unmanned aerial vehicle such that, responsive to a first object approaching a second object, the unmanned aerial vehicle is positioned for the image sensor to capture the visual information including the first and second objects;
        capture the visual information including the first and second objects; and
        mark the visual information at a point in time in which the first and second objects are separated by a predefined distance; and
    a gesture recognition component configured to recognize or interpret gestures from the first object in real time so that a flight control subsystem or sensor control system of the unmanned aerial vehicle can implement a change based upon the gestures from the first object.

2. The system of claim 1, wherein the one or more physical processors are configured to:
    determine a first position of the first object based on the visual information; and
    determine a second position of the second object based on the visual information.

3. The system of claim 2, wherein the flight control is provided such that any of the target altitude differential, a target cardinal direction, and the target distance is maintained between the unmanned aerial vehicle and the second object based on the first position and the second position.

4. The system of claim 1, wherein providing the flight control includes controlling any of an altitude, a longitude, a latitude, a geographical location, a heading, and a speed of the unmanned aerial vehicle.

5. The system of claim 1, wherein the visual information is a video frame of a video segment.

6. The system of claim 5, wherein the one or more physical processors are configured to:
    mark the video segment at a point in time in which the first and second objects overlap.

7. The system of claim 1, wherein the flight control is provided such that any of the target altitude differential, a target cardinal direction, and the target distance is adjusted between the unmanned aerial vehicle and the second object based on the gestures associated with the first object.

8. The system of claim 1, wherein the flight control is provided such that the unmanned aerial vehicle being positioned for the image sensor to capture the visual information includes repositioning the unmanned aerial vehicle from an original position to a new position.

9. The system of claim 1, wherein the flight control is provided such that any of the target altitude differential, a target cardinal direction, and the target distance is adjusted between the unmanned aerial vehicle and the first object based on the gestures associated with the first object.

10. A method for adjusting flight control of an unmanned aerial vehicle, the method performed by a computing system including one or more physical processors, the method comprising:
    determining a first position of a first object based on visual information;
    determining a second position of a second object based on the visual information;
    providing the flight control for the unmanned aerial vehicle such that, responsive to the first object approaching the second object, the unmanned aerial vehicle is positioned to capture the visual information including the first and second objects;

capturing the visual information including the first and second objects;

marking the visual information at a point in time in which the first and second objects are separated by a predefined distance; and implementing a change in real time based upon gestures of the first object.

11. The method of claim 10, wherein the flight control is provided such that any of the target altitude differential, a target cardinal direction, and the target distance is maintained between the unmanned aerial vehicle and the second object based on the first position and the second position.

12. The method of claim 10, wherein providing the flight control includes controlling any of an altitude, a longitude, a latitude, a geographical location, a heading, and a speed of the unmanned aerial vehicle.

13. The method of claim 10, wherein the visual information is a video frame of a video segment; further comprising:

marking the video segment at a point in time in which the first and second objects overlap.

14. The method of claim 10, wherein the flight control is provided such that any of the target altitude differential, a target cardinal direction, and the target distance is adjusted between the unmanned aerial vehicle and the second object based on the gestures associated with the first object.

15. The method of claim 10, wherein the flight control is provided such that any of the target altitude differential, a target cardinal direction, and the target distance is adjusted between the unmanned aerial vehicle and the first object based on the gestures associated with the first object.

16. The method of claim 10, wherein the flight control is provided such that the unmanned aerial vehicle being positioned to capture the visual information includes repositioning the unmanned aerial vehicle from an original position to a new position.

17. A method comprising:

providing flight control for an unmanned aerial vehicle such that, responsive to a first object approaching a second object, the unmanned aerial vehicle is positioned to capture content including the first and second objects;

capturing the content including the first and second objects;

marking the content at a point in time in which the first and second objects are separated by a predefined distance;

recognizing or interpreting gestures from the first object in real time; and controlling any of an altitude, a longitude, a latitude, a geographical location, a heading, a speed of the unmanned aerial vehicle, a zoom of an image capture device, a target cardinal direction, and a target distance between the unmanned aerial vehicle and the first object.

18. The method of claim 17, further comprising adjusting a target altitude differential based upon an interpretation of the gestures from the first object.

19. The method of claim 17, further comprising tracking a particular object or person instead of the first object based on interpreting the gestures from the first object.

20. The method of claim 17, wherein a gesture recognition component recognizes and interprets the gestures from the first object in real time.

* * * * *